(12) United States Patent
Hoang

(10) Patent No.: US 7,180,891 B1
(45) Date of Patent: Feb. 20, 2007

(54) METHOD OF TRANSFERRING DATA TO MULTIPLE UNITS OPERATING IN A LOWER-FREQUENCY DOMAIN

(75) Inventor: Brian Hoang, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 967 days.

(21) Appl. No.: 10/057,393

(22) Filed: Jan. 25, 2002

(51) Int. Cl.
*H04J 11/00* (2006.01)
*H04L 12/56* (2006.01)
*H04L 12/54* (2006.01)
*H04L 12/04* (2006.01)

(52) U.S. Cl. .................. 370/386; 370/395.7; 370/412; 370/429

(58) Field of Classification Search ............... None
See application file for complete search history.

(56) References Cited

U.S. PATENT DOCUMENTS

| | | | |
|---|---|---|---|
| 4,525,849 A | | 6/1985 | Wolf |
| 4,685,101 A | * | 8/1987 | Segal et al. ............ 370/468 |
| 5,764,895 A | * | 6/1998 | Chung ..................... 709/250 |
| 5,991,270 A | * | 11/1999 | Zwan et al. ............. 370/249 |
| 5,999,023 A | | 12/1999 | Kim |
| 6,389,018 B1 | * | 5/2002 | Clauberg ................. 370/394 |
| 6,446,215 B1 | | 9/2002 | Meyer et al. |
| 6,628,679 B1 | * | 9/2003 | Talarek ................... 370/536 |

OTHER PUBLICATIONS

Data Sheet for HEF4017B MSI, 5-stage Johnson counter, Philips Semiconductor, Jan. 1995.*
Halsall, "Data Communications, Computer Networks and Open Systems", © 1992, p. 322.*

* cited by examiner

*Primary Examiner*—Ricky Q. Ngo
*Assistant Examiner*—Warner Wong
(74) *Attorney, Agent, or Firm*—Meyertons Hood Kivlin Kowert & Goetzel, P.C.; B. Noël Kivlin

(57) ABSTRACT

There is disclosed herein a multi-port frequency step-down queue that efficiently transfers data from a fast clock domain to a slow-clock domain having parallel hardware resources. In one embodiment, the queue includes a set of registers that are sequentially selected by an input counter that receives the fast clock. As the registers are selected, they store a data item from the input data stream. The queue also includes multiple multiplexers each having inputs that are sequentially selected by an output counter that receives the slow clock. The first multiplexer is coupled to the first N registers in the queue, the second multiplexer is coupled to the second N registers in the queue, etc. In this manner, the step-down queue generates multiple output FIFO data streams at the slower clock rate. Each of the output data streams may then be processed in parallel.

12 Claims, 3 Drawing Sheets

METHOD OF TRANSFERRING DATA TO MULTIPLE UNITS OPERATING IN A LOWER-FREQUENCY DOMAIN

BACKGROUND

1. Field of the Invention

The present invention relates generally to digital systems having multiple time domains and parallel hardware. More particularly, the present invention relates to an apparatus and method for distributing high bandwidth data among multiple units operating in parallel at a reduced clock rate.

2. Description of Related Art

A given system's computing power can be increased in numerous ways. Components can be made faster. Additional computing resources can be added. Both approaches offer respective advantages. Faster components allow higher clock rates to be used, but are often disproportionately expensive considering the gain in performance. Additional resources offer parallel execution of tasks that can be broken up into independent subtasks, but typically require additional overhead for allocating and monitoring resources for subtask execution.

Fortunately, the choices are not mutually exclusive. A clever system designer may choose to use both techniques to increase system performance. That is, some components may be made faster, while others are replicated for increased parallel processing performance. However, such use of both techniques creates a clock-domain split in the system across which data must travel. A method and apparatus for efficiently accomplishing such transfers would prove very beneficial in such systems.

SUMMARY OF THE INVENTION

Accordingly, there is disclosed herein a multi-port frequency step-down queue that efficiently transfers data from a fast clock domain to a slow-clock domain having parallel hardware resources. In one embodiment, the queue includes a set of registers that are sequentially selected by an input counter that receives the fast clock. As the registers are selected, they store a data item from the input data stream. The queue also includes multiple multiplexers each having inputs that are sequentially selected by an output counter that receives the slow clock. The first multiplexer is coupled to the first N registers in the queue, the second multiplexer is coupled to the second N registers in the queue, etc. In this manner, the step-down queue generates multiple output FIFO data streams at the slower clock rate. Each of the output data streams may then be processed in parallel.

BRIEF DESCRIPTION OF THE DRAWINGS

A better understanding of the present invention can be obtained when the following detailed description of the preferred embodiment is considered in conjunction with the following drawings, in which.

Figure 1:
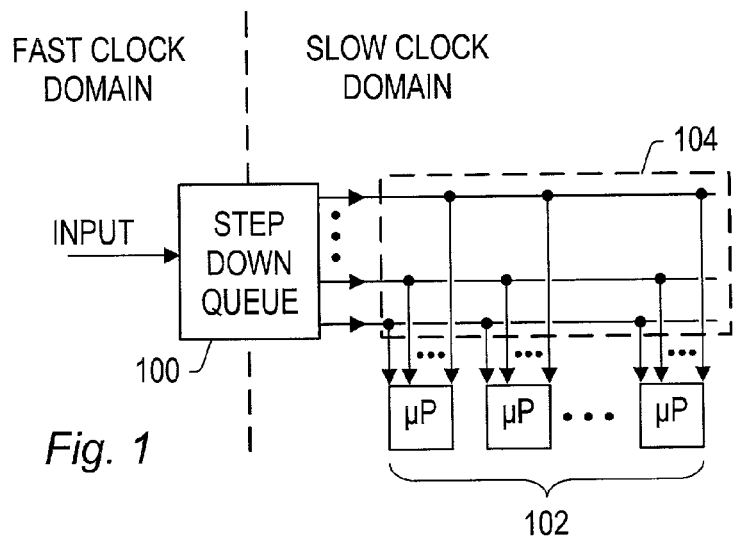
FIG. 1 illustrates the distribution of data from a fast clock domain to multiple units in a slow clock domain.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

Turning now to the figures, FIG. 1 shows a computing system having a fast clock domain and a slow clock domain. Data passing from the fast clock domain to the slow clock domain is distributed by a multi-port domain crossover element 100. In the system of FIG. 1, the slow clock domain includes multiple units 102 that operate in parallel on the data received from the fast clock domain. In a preferred embodiment, the number of ports from crossover element 100 equals the ratio of the fast clock frequency to the slow clock frequency (the "clock ratio") or an integer multiple thereof. An optional broadcast network 104 may be provided to communicate data from each of the domain crossover element's ports to all of the units 102. Alternatively, each of the ports may be coupled directly to one unit 102.

As an illustrative example, units 102 may be identically configured processing units that operate independently on blocks of data. Examples might include microcontrollers, microprocessors, or digital signal processors. The data could be, for example, message packets to be routed, electronic transactions to be processed, image blocks to be transformed, or similar items which can be processed independently.

In a preferred embodiment, the data blocks are data packets that contain fields for a packetID, a targetID, Control flags, and packet Data. Inclusion of a packetID allows the system to support out-of-order processing or other coherence protocols that may require later invalidation of operations. Inclusion of a targetID allows the system to control the distribution of packets to processing units or other downstream devices. (For example, in an embodiment having optional broadcast network 104 the units 102 may claim packets with a corresponding targetID and place them in a local buffer.) The Control flags may include byte enable information for packet data and/or other optional flags. The packet Data may include a designer-selected number of data bits.

Figure 2:
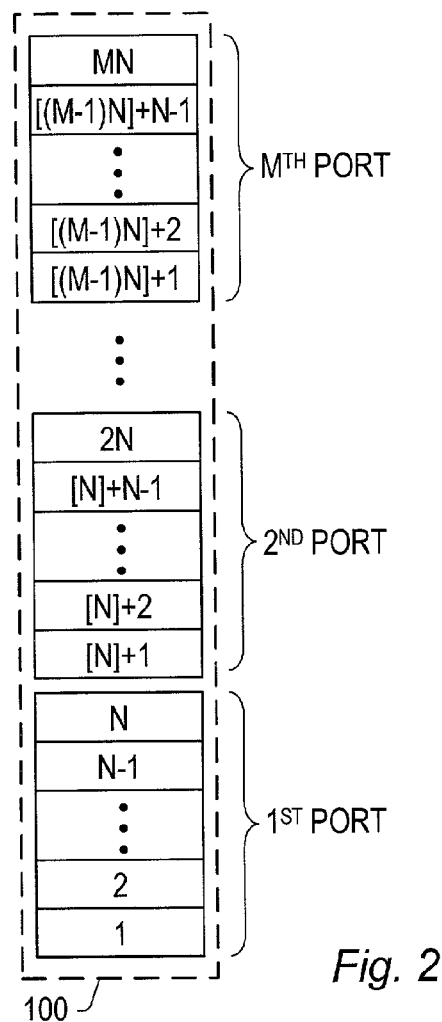
FIG. 2 shows a schematic of a circular buffer having storage locations allocated to selected units.

A preferred embodiment of crossover element 100 is shown in FIG. 2. Crossover element 100 is preferably a circular buffer divided into M sections each having N storage locations, where M is the number of ports. Each storage location of the buffer is preferably large enough to hold a complete data item. Alternatively, the value of N may be chosen so that one complete data item will fit in one buffer section. N is preferably 2 or greater, and N=4 has been found to be efficient in most cases. Higher values of N allow timing constraints to be relaxed. The system designer may adjust N to optimize system performance.

Each section of the buffer is associated with a corresponding port. Input data is written to buffer locations in sequential order, wrapping around when the buffer end is reached. Each of the ports provides data from its associated section in sequential order, wrapping around when the section end is reached. Consequently, the read and write operations cause the buffer to resemble a first-in first-out (FIFO) buffer, although the parallel nature of the read operations may cause some later-written locations to be read before some earlier-written locations. These anachronisms, however, only appear if read operations from different ports are compared. Such anachronisms will be absent from the data stream of any given port.

Figure 3:
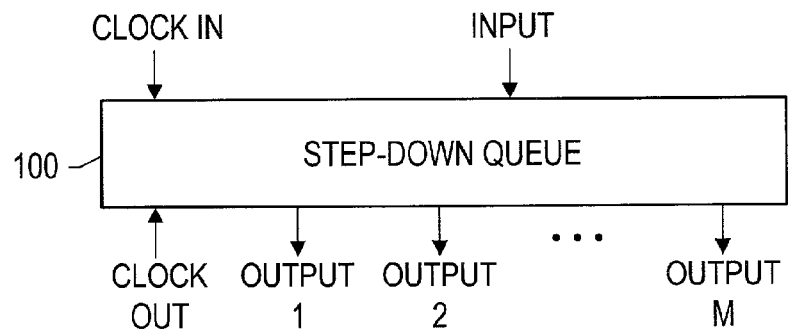
FIG. 3 shows an multi-port frequency step-down queue having labeled input and output signals.

FIG. 3 shows the input/output signals preferably associated with crossover element 100. Crossover element 100 preferably receives an input data stream (INPUT) along with an input clock signal (CLOCK IN). As the input clock signal cycles, values from the input data stream are sequentially stored in buffer storage locations. Crossover element 100 preferably also receives an output clock signal (CLOCK OUT), and responsively provides M output data streams (OUTPUT i). As the output clock cycles, the crossover element 100 sequentially reads storage locations from each buffer section to provide the M outputs signals.

Figure 4:
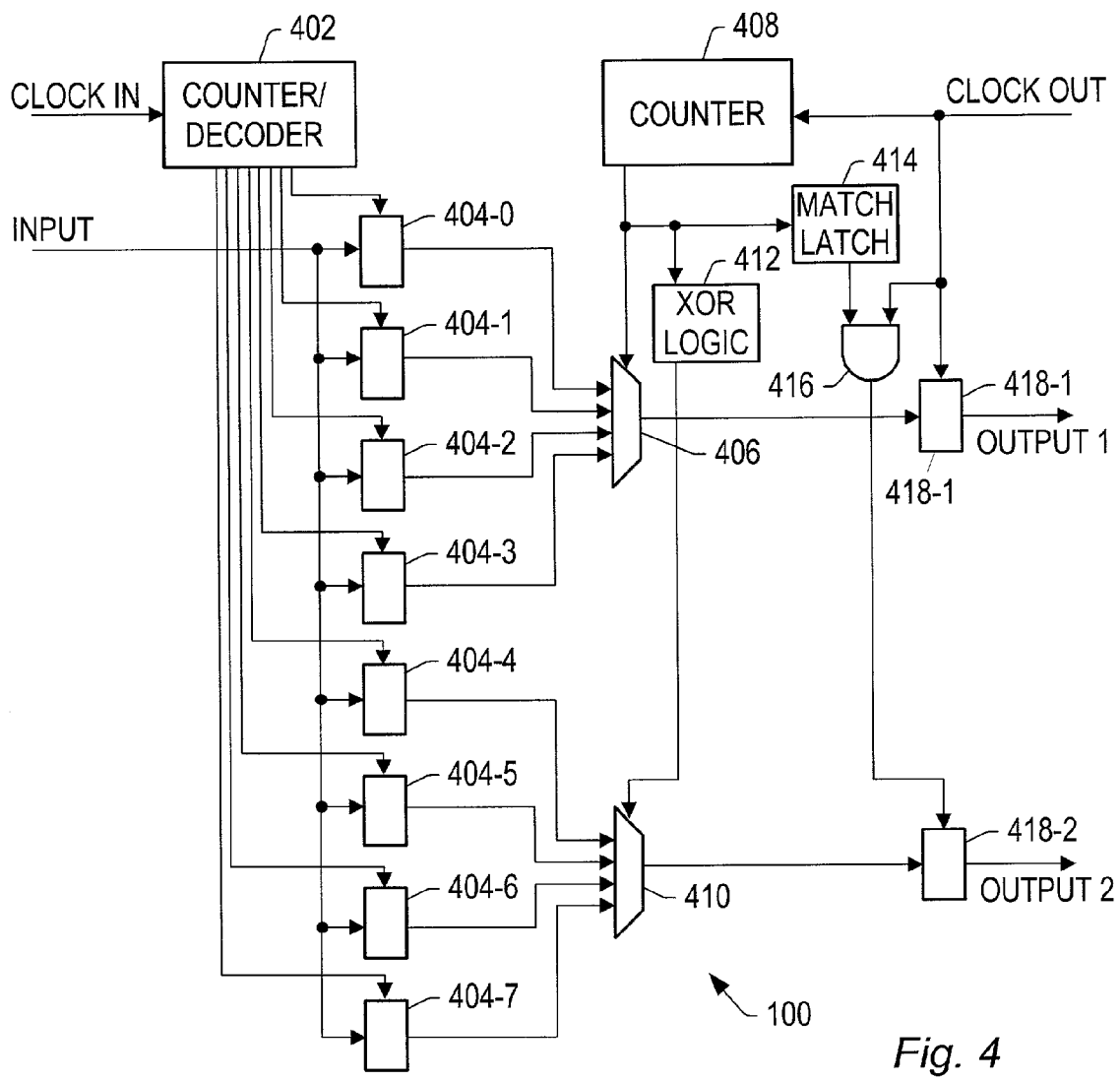
FIG. 4 shows an exemplary implementation of a multi-port frequency step-down queue.

FIG. 4 shows an exemplary embodiment of the crossover element 100 having M=2 and N=4. A counter/decoder 402 receives the input clock signal, and asserts exactly one of its MN outputs. The outputs are asserted sequentially as the input clock signal cycles. Counter/decoder 402 may be implemented as a circular shift register.

The output signals from the counter/decoder 402 are each coupled to a corresponding storage location register 404. As the counter/decoder 402 asserts an output signal, the corresponding storage location register 404 stores the input data. The output signals from the storage location registers 404-0 through 404-3 are coupled to a multiplexer 406, which provides the OUTPUT 1 signal in response to a control signal from counter 408. Counter 408 repeatedly counts from 0 to N−1 in response to the output clock signal.

In a similar fashion, the output signals from storage location registers 404-4 through 404-7 are coupled to multiplexer 410. The control signal for multiplexer 410 is a modified version of the control signal from counter 408. Logical XOR gates 412 operate to shift the count by M. (This operation will become clearer in the discussion of the next figure.) The multiplexer 410 provides the OUTPUT 2 signal in response to the modified control signal.

While the unit coupled to the OUTPUT 1 signal can begin reading values almost immediately from its buffer section, the unit coupled to the OUTPUT 2 signal preferably delays until one or more data values have been written to its buffer section. In the implementation of FIG. 4, this delay is provided by match latch 414 and logical AND gate 416. Registers 418 may be provided to latch the OUTPUT signals in response to the output clock and output of gate 416. Although not specifically shown, each of the elements 402, 404, 408 and 414 receives a reset signal that initializes the elements to a predetermined condition. The counter/decoder 402 is initialized to assert its last output signal. The registers 404 are initialized to zero. Counter 408 is initialized to N−1, and match latch 414 is initialized to zero. Match latch 414 thereafter compares the count to a predetermined value, and when the count reaches the predetermined value, the match latch goes high and remains high until reset. In this case the predetermined value is N/M, which corresponds to the point where an input value is stored in the first storage location of the second buffer section. The output signal from the match latch 414 causes the logical AND gate 416 to block the output clock for the OUTPUT 2 signal until counter 408 reaches N/M.

Figure 5:
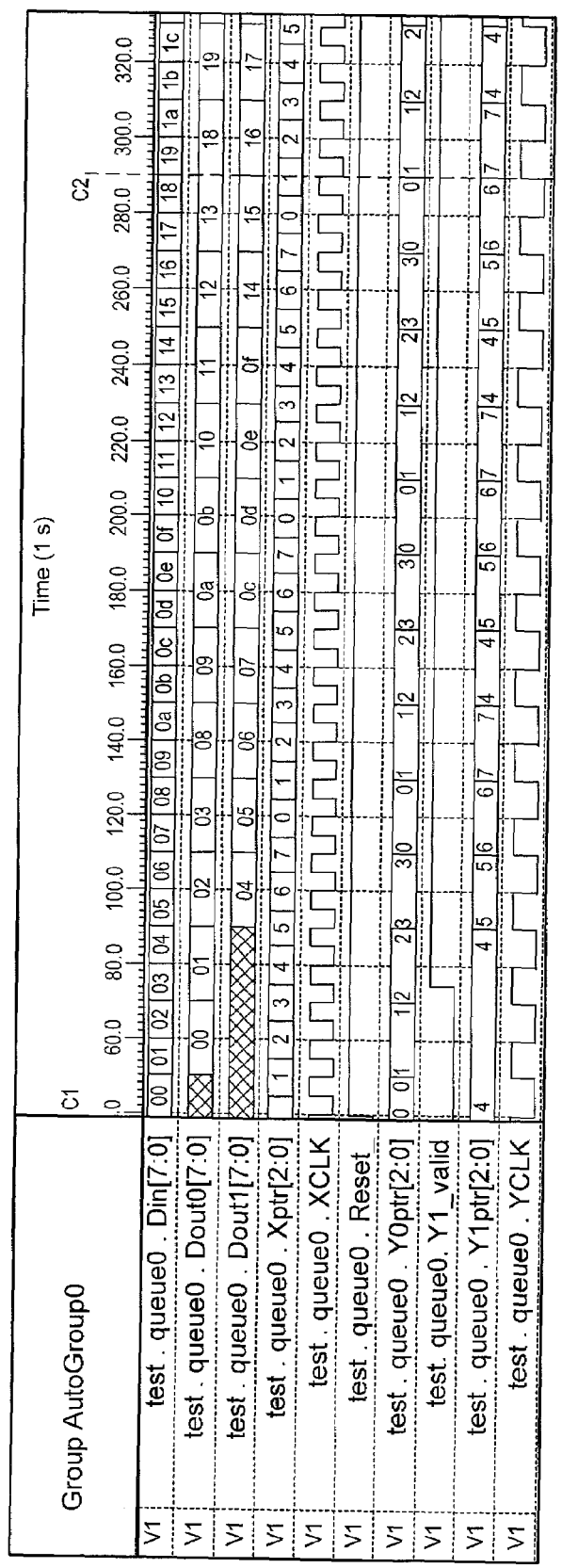
FIG. 5 shows an illustrative timing diagram for the various input and output signals of a multi-port frequency step-down queue.

FIG. 5 shows a signal timing diagram for a slightly different implementation of a crossover element 100 having M=2 and N=4. The different implementation is specified by Verilog HDL code provided in the appendix. In FIG. 5, the input signal is labeled test.queue0.Din[7:0], the first output signal is labeled test.queue0.Dout0[7:0], the second output signal is labeled test.queue0.Dout1[7:0], the input clock signal is labeled test.queue0.XCLK, and the output clock is labeled test.queue0.YCLK. Also shown are a reset signal (test.queue0.Reset_), an input counter value (test.queue0.Xptr[2:0]), two output counter values (test.queue0.Y0ptr[2:0] and test.queue0.Y1ptr[2:0]) and a second-output-is-valid signal (test.queue0.Y1_valid).

In FIG. 5, the input data is a sequence of bytes. The reset signal is de-asserted on a low-going edge of the input and output clocks, and thereafter, input bytes are latched into registers on upward-going transitions of the input clock. The phase relationship between the input and output clocks is such that transitions of the output clock always coincide with low-going transitions of the input clock. Because of this, the two clock signals are never simultaneously transitioning upward. This guarantees that the output signal values will never be changing during the upward going transitions of the output clock.

Input bytes are latched into registers on upward-going transitions of the input clock, and the input counter values are also incremented on upward-going transitions of the input clock. Output signal values can be latched on upward transitions of the output clock, and the output counter values are incremented on upward-going transitions of the output clock. The second-output-is-valid signal in this implementation is tied to the input counter value. When the input counter value reaches N, the valid signal goes high and remains there until the reset signal is asserted.

To aid in understanding of the crossover element, the input byte values in this timing diagram start at zero and increase sequentially. On the first upward-going transition of the input clock, the 00 byte is latched into the first storage register. On the first upward-going transition of the output clock, the 00 byte is provided on the first output signal line. On the second and third upward transitions of the input clock, the 01 and 02 bytes are respectively latched into the second and third storage registers. On the second upward-going transition of the output clock, the 01 byte is provided on the first output signal line. On the fourth upward-going transition of the input clock, the 03 byte is latched into the fourth storage register, and the valid signal goes high. On the fifth upward-going transition of the input signal, the 04 byte is latched into the fifth storage register. On the third upward-going transition of the output clock, the 02 byte is provided on the first output signal line, and the 04 byte is provided on the second output signal line.

On the sixth and seventh upward-going transitions of the input clock, the 05 and 06 bytes are latched into the sixth and seventh storage registers, respectively. The fourth upward-going transition of the output clock provides the 03 byte on the first output signal line and the 05 byte on the second output signal line. The eighth and ninth upward-going transitions of the input clock latch the 07 and 08 bytes in the eighth and first storage registers, respectively. The fifth upward-going transition of the output clock provides the 08 and 06 bytes on the first and second output lines, respectively. Operation continues in this manner.

The disclosed embodiments and implementations, and variations thereof, may advantageously implement a domain crossover circuit that distributes high bandwidth data to multiple, reduced-clock units with a minimal amount of complexity. Numerous variations and modifications will become apparent to those skilled in the art once the above disclosure is fully appreciated. It is intended that the following claims be interpreted to embrace all such variations and modifications.

The disclosed embodiments assume continuous operation. For those systems which may have irregular data flows, a field may be added to each of the storage registers to indicate whether the data is valid. When a shortage of input data exists, the queue may be "bubbled" with invalid entries to preserve the synchronization. The units would preferably be configured to recognize and ignore invalid entries. Alternatively, provisions may be added to halt the input clock. In the embodiment of FIG. 4, the output signal clocks may have a slightly more sophisticated circuit that tracks the value of counter/decoder 402 and halts the output signal clocks once all the buffer data has been read. Other variations are contemplated and embraced by the following claims.

APPENDIX

The following code is a Verilog listing of a multi-port frequency step down queue implementation. This implementation was used to determine the timing diagram shown in FIG. 5.

```
/**************************************************     *
*                                                        *
* DESIGNER:  Brian Hoang                                 *
* DATE:      03/21/01                                    *
*                                                        *
* DESIGN:    Multiport Frequency Step Down Queue.        *
*                                                        *
**************************************************** */
'define xfifo_depth    8
'define fifo_width     8
'define pointer_size   3
module xqueue (Dout0, Dout1, Din, XCLK, YCLK, Reset_);
output ['fifo_width-1:0]  Dout0;
output ['fifo_width-1:0]  Dout1;
input  ['fifo_width-1:0]  Din;
input                     XCLK; //Fast clock to drive front end FIFO
input                     YCLK; //Slow clock to drive back end FIFOs
input                     Reset_;
reg ['pointer_size-1:0]   Xptr;          //Load pointer
reg ['pointer_size-1:0]   Y0ptr;         //Unload pointer Y0
reg ['pointer_size-1:0]   Y1ptr;         //Unload pointer Y1
reg ['xfifo_depth-1:0]    XFIFO ['fifo_width-1:0];
reg ['fifo_width-1:0]     Dout0;
reg ['fifo_width-1:0]     Dout1;
reg                       Y1_valid;
always @(posedge XCLK)
  begin
    if(~Reset_)
      begin
        Xptr      <= 3'b0;
        Y1_valid  <= 1'b0;
      end
    else
      begin
        XFIFO[Xptr]  <= Din;
        Xptr <= Xptr + 1;
        if(Xptr == 3'b011)
           Y1_valid <= 1'b1;
      end
  end
always @(posedge YCLK)
  begin
```

-continued

```
    if(~Reset_)
       Y0ptr <= 3'b0;
    else
       begin
          Dout0 <= XFIFO[Y0ptr];
          if(Y0ptr == 3'b011)
             Y0ptr      <= 0;
          else
             Y0ptr <= Y0ptr + 1;
       end
  end
always @(posedge YCLK)
  begin
    if(~Reset_)
       Y1ptr <= 3'b100;
    else if(Y1_valid)
       begin
          Dout1 <= XFIFO[Y1ptr];
          if(Y1ptr == 3'b111)
             Y1ptr      <= 3'b100;
          else
             Y1ptr <= Y1ptr + 1;
       end
  end
endmodule
```

What is claimed is:

1. A digital system that comprises:
a plurality of units operating at a first clock rate, each unit configured to independently process a sequence of data items; and
a domain crossover element configured to receive a stream of data items at a second clock rate different from the first clock rate and configured to distribute separate sequences of data items through separate ports to the plurality of units, wherein the domain crossover unit includes a plurality of registers including a first subset and a second subset distinct from the first, wherein the domain crossover unit is configured to select one of the plurality of registers at the second clock rate and to store each data item in a selected register as the data items are received, and wherein the domain crossover unit is further configured to sequentially select one of the first subset of the plurality of registers at the first clock rate and one of the second plurality of registers at the first clock rate and concurrently read data items from the selected ones of the first and second subsets at the first clock rate.

2. The system of claim 1, wherein the domain crossover element comprises:
a counter/decoder configured to receive an input clock operating at the second clock rate and responsively assert sequential ones of a plurality of output signals, wherein registers of the first and second subsets is coupled to receive a corresponding one of the plurality of output signals, wherein each of the plurality of registers is configured to store an input data item when the corresponding one of the plurality of output signals is asserted;
a plurality of multiplexers each configured to provide a sequence of data items to one of the separate ports, wherein each of the multiplexers is coupled to one of the plurality of registers associated with said one of the separate ports; and
an output counter that receives an output clock operating at the first clock rate, wherein the output counter is coupled to one or more of the multiplexers and configured to sequentially select an associated one of the plurality of registers for the one or more multiplexers to access to provide said sequences of data items.

3. A domain crossover element that comprises:
an input counter that receives an input clock;
a plurality of storage location registers that are sequentially selected by the input counter and configured to store a data item from an input stream when selected;
an output counter that receives an output clock having a slower clock rate than the input clock;
a first multiplexer having inputs that are sequentially selected by the output counter, wherein the inputs of the first multiplexer are coupled to respective storage location registers in a first subset of the plurality storage location registers; and
a second multiplexer having inputs that are sequentially selected by the output counter, wherein the inputs of the second multiplexer are coupled to respective storage locations in a second subset of the plurality of storage location registers, wherein the second subset is distinct from the first subset.

4. The domain crossover element of claim 3, further comprising:
a set of logic gates that shifts selected inputs of the second multiplexer relative to the selected inputs of the first multiplexer.

5. The domain crossover element of claim 3, further comprising:
a validity latch that is de-asserted upon initialization, and that becomes asserted once at least one of the storage location registers in the second subset has stored a data item from the input stream.

6. The domain crossover element of claim 5, wherein the validity latch's state is used to gate a clock signal associated with output from the second multiplexer.

7. The domain crossover element of claim 3, wherein the plurality of storage location registers includes eight storage location registers, and wherein the first subset includes the first four storage location registers, and the second subset includes the second four storage location registers.

8. The domain crossover element of claim 3, wherein each of the plurality of storage location registers has an associated validity register that indicates if the corresponding storage location register has been written and not read.

9. A method of distributing a stream of data items received at a first clock rate among a plurality of processing units operating at a second, slower clock rate, the method comprising:
sequentially selecting one of a plurality of registers at the first clock rate;
storing each data item from the stream of data items in a selected register as the data items are received;
sequentially selecting one of a first subset of the plurality of registers at the second clock rate;
sequentially selecting one of a second subset of the plurality of registers at the second clock rate, wherein the second subset is distinct from the first subset; and
concurrently reading data items from the selected ones of the first and second subsets at the second clock rate.

10. The method of claim 9, wherein the first data item read from the first subset is read at a different time than the first data item read from the second subset.

11. The method of claim 9, wherein all registers in the second subset are written after all registers in the first subset.

12. The method of claim 9, further comprising:
continuously repeating the acts of claim 9 while a reset signal is de-asserted.

* * * * *